(12) United States Patent
Soucek et al.

(10) Patent No.: US 9,975,769 B2
(45) Date of Patent: May 22, 2018

(54) METHOD FOR PROCESSING OF EXPIRED SOLID ROCKET PROPELLANT

(71) Applicant: ERUCA TECHNOLOGIES S.R.O., Novy Bohumin (CZ)

(72) Inventors: Martin Soucek, Opava (CZ); Michal Cernoch, Mankovice (CZ); Jan Kupka, Ostrava-Proskovice (CZ); Jan Mysik, Ostrava-Poruba (CZ)

(73) Assignee: ERUCA TECHNOLOGIES S.R.O. (CZ)

( * ) Notice: Subject to any disclaimer, the term of this patent is extended or adjusted under 35 U.S.C. 154(b) by 0 days. days.

(21) Appl. No.: 15/216,375

(22) Filed: Jul. 21, 2016

(65) Prior Publication Data
US 2016/0325992 A1  Nov. 10, 2016

Related U.S. Application Data

(63) Continuation-in-part of application No. PCT/CZ2014/000164, filed on Dec. 29, 2014.

(30) Foreign Application Priority Data

Jan. 21, 2014 (CZ) .................................. 2014-48

(51) Int. Cl.
  *C01B 11/18* (2006.01)
  *C06B 21/00* (2006.01)
  *C06B 29/22* (2006.01)

(52) U.S. Cl.
  CPC ........ *C01B 11/185* (2013.01); *C06B 21/0091* (2013.01); *C06B 29/22* (2013.01)

(58) Field of Classification Search
  CPC .... C01B 11/185; C06B 21/0091; C06B 29/22
  See application file for complete search history.

(56) References Cited

U.S. PATENT DOCUMENTS

| | | | |
|---|---|---|---|
| 3,451,789 A | 6/1969 | McIntosh | |
| 4,098,627 A | 7/1978 | Tompa et al. | |
| 4,198,209 A | 4/1980 | Shaw et al. | |
| 4,229,182 A * | 10/1980 | Frosch | C22B 21/0023 |
| 4,662,893 A | 5/1987 | McIntosh | |
| 4,758,387 A * | 7/1988 | Sayles | C06B 21/0091 |
| | | | 149/109.6 |
| 4,854,982 A | 8/1989 | Melvin et al. | |
| 5,314,550 A * | 5/1994 | Nahlovsky | C06B 21/0091 |
| | | | 149/109.6 |
| 5,331,106 A | 7/1994 | Spas | |
| 5,346,512 A | 9/1994 | Miks et al. | |
| 5,516,971 A * | 5/1996 | Hurley | A62D 3/35 |
| | | | 149/124 |
| 5,552,093 A * | 9/1996 | Lee | C06B 21/0091 |
| | | | 149/109.6 |

FOREIGN PATENT DOCUMENTS

| | | |
|---|---|---|
| DE | 4230318 A1 | 8/1993 |
| RU | 2011126486 A | 1/2013 |
| WO | 2015/110095 A1 | 7/2015 |

OTHER PUBLICATIONS

International Search Report and Written Opinion dated Apr. 23, 2015 in Corresponding PCT/CZ2014/000164 (9 pages).
International Preliminary Report on Patentability Completed May 12, 2016 in Corresponding PCT/CZ2014/000164 (5 pages).
www.cenia.cz/eia/info/ZLK480, Amec, Vystavba Zarizeni pro recyklaci chloristanu amonneho z expirovaneho raketoveho paliva, Ieden 2010, p. 11, with English Translation (5 pages).
McIntosh, et al., Solid Rocket Propellant Waste Disposal Ingredient Recovery Study, Thiokol/Wasatch, Jul. 1975 (8 pages).
Search Report from Corresponding CZ PV 2014-48 dated Sep. 26, 2014 (3 pages).

* cited by examiner

Primary Examiner — Ngoc-Yen Nguyen
(74) Attorney, Agent, or Firm — Hovey Williams LLP; Joan Herman

(57) ABSTRACT

A method for processing of expired solid rocket propellant containing ammonium perchlorate, powdered aluminum, and a rubber-based binder for the purpose of recycling ammonium perchlorate, the method comprising: a) wet disintegration of solid propellant in a solution to produce a suspension of solid substances; b) leaching of the suspension of solid substances at an increased temperature in a leaching solution to produce an ammonium perchlorate solution, the leaching solution including at least one of water and unsaturated ammonium perchlorate and containing added inert material based on at least one of porous carbon, diatomaceous earth and a polymer; c) wherein the use of the inert material during the leaching process increases de-agglomeration and decreases re-agglomeration of solid substances of the suspension of solid substances; d) separation of the ammonium perchlorate solution from the suspension of solid substances, the separated ammonium perchlorate solution also containing at least some of the inert material; e) refining of the separated ammonium perchlorate solution from step d) at an increased temperature; f) separation of the at least some of the inert material from the separated ammonium perchlorate solution to produce recycled ammonium perchlorate; g) crystallization of the recycled ammonium perchlorate.

13 Claims, No Drawings

METHOD FOR PROCESSING OF EXPIRED SOLID ROCKET PROPELLANT

RELATED APPLICATIONS

This is a national stage application under 35 U.S.C. § 371 of International Application PCT/CZ2014/000164 filed on Dec. 29, 2014, which claims the benefit of Czech Republic application Serial No. PV 2014-48 filed Jan. 21, 2014, the entire disclosures of which are incorporated herein by reference.

TECHNICAL FIELD

The invention relates to processing of expired solid rocket propellant, which contains ammonium perchlorate, powdered aluminium and a rubber-based binder as the three main components, for the purpose of ammonium perchlorate recycling.

BACKGROUND ART

Several documents deal with processing of rocket propellant for the purpose of ammonium perchlorate recycling.

The patent U.S. Pat. No. 4,854,982 uses liquid ammonia for the processing. The presence of liquid ammonia (required to maintain a high pressure and the toxicity of ammonia) represents a disadvantage of this method, along with a low capacity of the technology related to a unit of investment costs.

However, most patents use leaching of ammonium perchlorate into an aqueous solution as the principal basic part of the processing.

The patent U.S. Pat. No. 3,451,789 gradually processes propellant by disintegration, leaching of ammonium perchlorate into a hot aqueous solution followed by multiple-stage separation of the solid residue after leaching from the obtained solution.

The patent U.S. Pat. No. 4,662,893 deals with the construction of a leaching unit.

A disadvantage of the two above mentioned patents is the problem of formation of agglomerates of solid residues of the propellant during disintegration, leaching and separation from the solution, which results in high energy and construction demands and a reduction of efficiency of the recycling process.

The patent U.S. Pat. No. 4,198,209 addresses this problem by adding surfactants (surface active agents). A disadvantage of this treatment is contamination of the obtained ammonium perchlorate solution by a foreign substance and formation of foam causing technological problems during further processing.

This problem is addressed in the U.S. patents U.S. Pat. No. 4,198,209 to Frosch et al.: "Process for the leaching of AP from propellant" (1980); U.S. Pat. No. 3,451,789 to McIntosh: "Oxidizer recovery process" (1969); U.S. Pat. No. 4,662,893 to McIntosh: "Hydraulic waste propellant macerator and method of use" (1997); U.S. Pat. No. 4,854,982 to Melvin et al.: "Method to dimilitarize extract, and recover ammonium perchlorate from composite propellants using liquid ammonia" (1989); and U.S. Pat. No. 4,098,627 to Tompa et al.: "Solvolyptic Degradation of Pyrotechnic Materials Containing Crosslinked Polymers" (1978).

DISCLOSURE OF INVENTION

The subject of the invention is an improved method for processing of expired solid rocket propellant that contains ammonium perchlorate, powdered aluminium and a rubber-based binder as its three main components. The invention more particularly relates to a process for obtaining and recycling ammonium perchlorate from such propellant in a desired purity, and to address at least some disadvantages resulting from the prior art disclosed above.

This means that the invention deals with a method for processing of expired solid rocket propellant containing ammonium perchlorate, powdered aluminium, and a rubber-based binder to recycle ammonium perchlorate. One embodiment of the method comprises:

a) wet disintegration of the solid propellant in a solution to produce a suspension of solid substances;

b) leaching of the suspension of solid substances at an increased temperature in a leaching solution to produce an ammonium perchlorate solution, the leaching solution including at least one of water and unsaturated ammonium perchlorate and containing added inert material based on at least one of porous carbon, diatomaceous earth and a polymer;

c) wherein the use of the inert material during the leaching process increases de-agglomeration and decreases re-agglomeration of solid substances of the suspension of solid substances;

d) separation of the ammonium perchlorate solution from the suspension of solid substances, the separated ammonium perchlorate solution also containing at least some of the inert material;

e) refining of the separated ammonium perchlorate solution from step d) at an increased or elevated temperature;

f) separation of the inert material from the separated ammonium perchlorate solution optionally followed by concentrating recycled ammonium perchlorate of the separated ammonium perchlorate solution;

g) crystallization and optional re-crystallization of the recycled ammonium perchlorate.

As used herein, an "increased temperature" is a temperature greater than about 20° C.

Besides the three main components—i.e. ammonium perchlorate, powdered aluminium and a rubber-based binder—the expired rocket propellant may also contain minority admixtures including, e.g., ferric oxide, cupric dichromate, di(2-ethylhexyl)adipate, di(2-ethylhexyl)azelate, triphenylbismuth, pyrogallol, magnesium oxide, or 2,4-pentanedione.

In accordance with the above mentioned method for processing according to an embodiment of the invention, the solid rocket propellant is removed from the rocket engine in a considerate mechanical-physical-chemical way (preferably, e.g., by being cut out with a water jet) and is disintegrated under wet conditions (e.g., while the medium is water and/or a diluted ammonium perchlorate solution), preferably in a mill, providing a suspension of solid substances and a solution.

Solid rocket propellant can also be disintegrated by at least one of cutting in a cutter, crushing in a crusher, or otherwise disintegrating in another suitable device.

While being stirred, the resulting suspension of solid substances is fed into a leaching tank where a leaching solution (a water and/or an unsaturated ammonium perchlorate solution containing inert material) was placed in advance.

The inert material may include an inorganic or organic material that is chemically inert to water and/or the ammonium perchlorate solution, as appropriate, and preferably comprises particles with a size of 1 μm to 20 mm, whose density in the wet state is 800-2000 kg m$^{-3}$, and that does not exhibit adhesive or self-adhesive properties in the wet state.

The inert material is preferably a material based on porous carbon, more preferably powdered active carbon, and most preferably powdered active carbon from previous refining of ammonium perchlorate solution.

A preferable inert material may also be a material based on diatomaceous earth, more preferably kieselguhr.

The inert material may also be a polymer-based material, preferably a thermoplastic such as polyethylene or polypropylene. A crushed thermoplastic material that includes polyethylene, polypropylene, or the like is more preferable.

In an embodiment of the method according to the invention, the quantity of the added inert material is preferably at least 0.5% by weight, and more preferably 1.5% by weight, based on the dry basis weight of solid propellant residues (i.e. dry basis of the binder with admixed aluminium powder).

In accordance with an embodiment of the invention a particle size of the inert material is preferably in the range from about 1.0 μm to about 20 mm for roughly spherical particles. Particles of an elongated shape, in particular flat, may be larger than 20 mm in one direction.

Leaching of the suspension of solid substances is preferably carried out at elevated temperature while being stirred, the elevated temperature being from about 50° C. to about 90° C. The leaching preferably occurs for at least 15 minutes, while ammonium perchlorate is leached into the leaching solution to generate the ammonium perchlorate solution.

During the leaching step the inert material causes or increases de-agglomeration of the solid substances and prevents or reduces re-agglomeration, which may make the entire leaching process of ammonium perchlorate considerably more efficient. This process may uncover the surface of the solid substances, which may support easier and more intensive leaching of ammonium perchlorate into the leaching solution.

The suspension of solid substances is then subjected to separation of the resulting ammonium perchlorate solution from the solid substances, i.e. solid propellant residues (wet binder with admixed aluminium powder), for example by filtration. A filtration device can be preferably used that enables pressure action during the filtration and washing of the filtration cake (e.g., with a diluted solution of ammonium perchlorate and/or water), which may result in a high degree of separation.

After that, the separated solution of ammonium perchlorate may proceed to a further processing step (refining the separated ammonium perchlorate solution and obtaining pure crystals of recycled ammonium perchlorate by means of crystallization).

The separated ammonium perchlorate solution can be further refined with powdered active carbon with subsequent filtration, more preferably pressure filtration while the used active carbon can be re-used for introduction into the leaching solution in step b) leaching as the inert material.

An advantage of embodiments of this method in accordance with the invention is elimination of agglomerates during the processing in the leaching step. These agglomerates, including sticky disintegrated pieces of solid rocket propellant, may have the character of dense elastic matter. The inert material may prevent formation of agglomerates during the leaching process, considerably improving the leaching process (easier and less energy-demanding stirring and more efficient leaching as well as a relatively simpler design of the equipment).

In the method according to embodiments of the invention the inert material further prevents or reduces agglomeration of solid propellant residues during separation, which may enable improvement of the separation process and use of solid residues of the propellant, as even after pressure filtration they can be easily reshaped into a bulk material with a low content of remaining ammonium perchlorate, which may make further processing and use possible.

Without addition of an inert material, pressure filtration may turn solid propellant residues into a homogeneous elastic mass.

Another advantage of embodiments of the above mentioned process is that recycled ammonium perchlorate obtained using the method may not be contaminated by addition of another chemical, as the inert material preferably remains at least in part in the solid propellant residues after the separation.

EXAMPLES 1.1. Laboratory Demonstration

In the first trial wet propellant residues were compressed in the bulk state in a press whose body was a metallic tube. The compression temperature was 80° C., compression pressure 0.7 MPa, compression time 30 minutes. The result was solid matter of propellant residues in a cylinder shape.

The second trial was carried out similarly with the difference that wet solid propellant residues were mixed with powdered active carbon before the trial (3.5% by weight of carbon based on the dry basis weight of the solid propellant residues). The result of the compression was cylinders that had a larger diameter than cylinders from the first trial due to lower cohesion (effort for elastic return to the original uncompressed state). The cylinders from the second trial could be easily crumbled up to the bulk state.

The third trial was carried out similarly to the second trial, but the wet solid propellant residues were mixed with 1 mm (particle size) polypropylene particles before the trial (1.5% by weight of polypropylene based on the dry basis weight of the solid propellant residues). The results were similar to the second trial.

The fourth trial was carried out similarly to the second trial, but the wet solid propellant residues were mixed with 10 mm (particle size) particles of crushed poly(ethylene terephthalate) (PET) before the trial (1.5% by weight of crushed PET based on the dry basis weight of the solid propellant residues). The results were similar to the second trial.

The fifth trial was carried out similarly to the second trial, but the wet solid propellant residues were mixed with filtration kieselguhr before the trial (2.0% by weight of filtration kieselguhr based on the dry basis weight of the solid propellant residues). The results were similar to the second trial.

1.2. Operation Test

A leaching tank was charged with 2500 kg of a 15% solution of ammonium perchlorate and 50 kg of an inert material, including powdered active carbon with a moisture content of 50%. This active carbon had been previously used for refining of an ammonium perchlorate solution. The mixture was stirred and maintained at the temperature of 85° C.

The processed material was solid rocket propellant in the form of 50×40×30 cm prisms obtained by cutting from a rocket engine with a water jet, having the following weight composition: ammonium perchlorate 40%, water 18%, solid residue 42%.

3500 kg of solid rocket propellant, sprayed with a 15% solution of ammonium perchlorate (a total amount of 1000 kg of the sprinkling solution with the temperature of 25° C.

was used), were disintegrated in an industrial cutter and the resulting mixture was continuously transported to the leaching tank the content of which was continuously stirred while its temperature was maintained at 85° C. After completion of the disintegration the suspension mixture was stirred for 15 min in the leaching tank.

Then, the mixture was separated with the use of a chamber filter press. The filter press being full, the filling pressure was about 1 MPa. After that the filtration cake was blown with air, washed with demineralised water (3000 kg in total) and compressed using a pressure of 0.5 MPa.

The separated solution and washing water were concentrated by evaporation and refined with active carbon. After removal of active carbon by filtration, a recycled ammonium perchlorate of high purity was obtained by crystallization and re-crystallization, see Table 1.

After opening of the chamber filter press, the filtration cake of solid residues of the propellant was retained in a collection tank and crumbled up into the form of bulk and easy to process matter with a low remaining content of ammonium perchlorate. The properties of the separated solid propellant residues are shown in Table 2. The calculated yield from the point of view of ammonium perchlorate recycling was 99.0%.

The same trial conducted without any addition of active carbon, but rather with addition of PET chips (80 kg) with particle size of 10 mm, resulted in free-flowing and easily workable mass having a low residual content of ammonium perchlorate, see Table 3.

The same trial conducted without any addition of active carbon, but rather with addition of 10 kg of surface active agent (SDS-sodium dodecyl sulphate) resulted in more difficult workable mass having a medium residual content of ammonium perchlorate, see Table 4. In addition, the surface active agent contained in solutions caused technological difficulties in subsequent processing (e.g. solution foaming, changes in the crystallization process, etc.).

The same trial conducted without any addition of active carbon or any alternative additives listed above resulted in the filtration cake being caught in the collection tank in the form of solid coherent plates that could not be processed any longer. The content of ammonium perchlorate in the material obtained this way was 4.3% by weight, see Table 5, at least in part because both blowing-through and filter-washing effects were considerably decreased due to compactness of plates in the filtrate cake.

TABLE 1

Purity of recycled ammonium perchlorate

| Property in accordance with STANAG 4299, type 1 | Requirement | Result |
|---|---|---|
| Purity [% by weight] | ≥99.0 | 99.8 |
| Cl⁻ as $NH_4Cl$ [% by weight] | ≤0.1 | 0.001 |
| $ClO_3^-$ as $NH_4ClO_3$ [% by weight] | ≤0.02 | <0.003 |
| $BrO_3^-$ as $NH_4BrO_3$ [% by weight] | ≤0.004 | <0.002 |
| Sulphate ashes [% by weight] | ≤0.15 | <0.02 |
| Substances insoluble in water [% by weight] | ≤0.03 | 0.007 |
| pH [—] | <4.3-5.8> | 4.5 |
| $SO_4^{2-}$ as $(NH_4)_2SO_4$ [% by weight] | ≤0.20 | 0.004 |
| Fe as $Fe_2O_3$ [% by weight] | ≤0.0035 | 0.00086 |
| Sum of Na, K, Ca [% by weight] | ≤0.08 | 0.0075 |
| Substances soluble in ether [% by weight] | ≤0.01 | <0.001 |

TABLE 2

Properties of the solid propellant residues after separation (addition of active carbon)

| Property | Value |
|---|---|
| Moisture [% by weight] | 18 |
| Content of ammonium perchlorate [% by weight] | 0.7 |
| Content of ammonium perchlorate in the dry basis [% by weight] | 0.9 |

TABLE 3

Properties of the solid propellant residues after separation (addition of PET chips)

| Property | Value |
|---|---|
| Moisture [% by weight] | 19 |
| Content of ammonium perchlorate [% by weight] | 0.6 |
| Content of ammonium perchlorate in the dry basis [% by weight] | 0.7 |

TABLE 4

Properties of the solid propellant residues after separation (addition of SDS)

| Property | Value |
|---|---|
| Moisture [% by weight] | 17 |
| Content of ammonium perchlorate [% by weight] | 1.5 |
| Content of ammonium perchlorate in the dry basis [% by weight] | 1.8 |

TABLE 5

Properties of the solid propellant residues after separation (without any addition)

| Property | Value |
|---|---|
| Moisture [% by weight] | 19 |
| Content of ammonium perchlorate [% by weight] | 4.3 |
| Content of ammonium perchlorate in the dry basis [% by weight] | 5.3 |

Industrial Utilization

Methods of embodiments of the invention may be used on an industrial scale to process solid rocket propellant that contains ammonium perchlorate, powdered aluminium and a rubber-based binder as its three main components, for the purpose of recycling the ammonium perchlorate contained in it.

Recycled ammonium perchlorate prepared with the use of methods in accordance with embodiments of the invention preferably exhibit a purity of up to 99.8%.

What is claimed is:

1. A method for processing of expired solid rocket propellant containing ammonium perchlorate, powdered aluminium, and a rubber-based binder for the purpose of recycling ammonium perchlorate, the method comprising:
    a) wet disintegrating the solid propellant in a solution to produce a suspension of solid substances;
    b) leaching of the suspension of solid substances at an increased temperature in a leaching solution to produce an ammonium perchlorate solution, the leaching solution including at least one of water and unsaturated ammonium perchlorate and containing added inert material based on at least one of porous carbon, diatomaceous earth and a solid polymer;

c) wherein the use of the inert material during the leaching process increases de-agglomeration and decreases re-agglomeration of solid substances of the suspension of solid substances;

d) separating the ammonium perchlorate solution from the suspension of solid substances, the separated ammonium perchlorate solution also containing at least some of the inert material;

e) refining of the separated ammonium perchlorate solution from step d) at an increased temperature;

f) separating at least some of the inert material from the refined ammonium perchlorate solution to produce recycled ammonium perchlorate;

g) crystallizing the recycled ammonium perchlorate.

2. The method in accordance with claim 1, wherein the disintegrating is carried out in a wet state by one of grinding in a mill, crushing in a crusher and cutting in a cutter.

3. The method in accordance with claim 1, wherein the inert material is based on porous carbon and includes powdered active carbon.

4. The method in accordance with claim 1, wherein the inert material is based on diatomaceous earth and includes kieselguhr.

5. The method in accordance with claim 1, wherein the inert material is polymer-based and includes a thermoplastic having at least one of polyethylene and polypropylene.

6. The method in accordance with claim 3, wherein the powdered active carbon is used powdered active carbon produced from previous performance of steps e) and f).

7. The method in accordance with claim 1, wherein a particle size of the inert material is from about 1.0 μm to about 20 mm.

8. The method in accordance with claim 1, wherein an amount of the added inert material is at least 0.5% by weight based on a total dry basis weight of the solid substances initially in the suspension of solid substances.

9. The method in accordance with claim 8, wherein the amount of the added inert material is about 1.5%.

10. The method in accordance with claim 1, wherein the steps b) and c) are carried out at a temperature from about 50° C. to about 90° C. for at least 15 minutes.

11. The method in accordance with claim 1, wherein in step d) the suspension is subjected to filtration to produce filtration cake including solid substances of the suspension of solid substances, and the filtration cake is washed with at least one of water and diluted solution of ammonium perchlorate.

12. The method in accordance with claim 1, wherein the separating step f) includes concentrating the recycled ammonium perchlorate.

13. The method in accordance with claim 1, wherein the crystallizing step g) includes re-crystallizing the recycled ammonium perchlorate.

* * * * *